United States Patent
Espinoza et al.

(10) Patent No.: US 6,800,664 B1
(45) Date of Patent: Oct. 5, 2004

(54) CONJOINED REACTOR SYSTEM

(75) Inventors: Rafael L. Espinoza, Ponca City, OK (US); Jianping Zhang, Ponca City, OK (US); Sergio R. Mohedas, Ponca City, OK (US); James D. Ortego, Jr., Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/444,459

(22) Filed: May 23, 2003

(51) Int. Cl.[7] .............................................. C07C 27/00
(52) U.S. Cl. ...................... 518/706; 518/700; 518/712
(58) Field of Search ............................... 518/700, 706, 518/712

(56) References Cited

U.S. PATENT DOCUMENTS

| | | | |
|---|---|---|---|
| 4,746,762 A | 5/1988 | Avidan et al. | 585/417 |
| 5,348,982 A | 9/1994 | Herbolzheimer et al. | 518/700 |
| 6,153,086 A | 11/2000 | Gupta et al. | 208/59 |
| 6,348,510 B1 | 2/2002 | Maretto et al. | 518/715 |
| 6,403,660 B1 | 6/2002 | Espinoza et al. | 518/700 |
| 6,516,809 B1 | 2/2003 | Schumacher | 131/79 |
| 6,570,047 B1 | 5/2003 | Mart et al. | 585/899 |
| 6,593,377 B1 | 7/2003 | Harford et al. | 518/706 |
| 2004/0024276 A1 * | 2/2004 | Smith et al. | 585/639 |

* cited by examiner

*Primary Examiner*—J. Parsa
(74) *Attorney, Agent, or Firm*—Conley Rose, P.C.

(57) ABSTRACT

A gas-agitated multiphase reactor system with multiple reaction zones comprising gas-liquid or gas-liquid-solid mixtures that can maximize the production rate while allowing better control of the temperature distribution and better control of the liquid and solid phases in the reactors. Still more particularly, this invention relates to a method for operating a pair of linked gas-agitated slurry reaction zones such that the hydrodynamic behavior and reactor performance of such reactor system are improved compared to that of a conventional slurry bed reactor.

16 Claims, 8 Drawing Sheets

CONJOINED REACTOR SYSTEM

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

The present invention relates to a process for the preparation of hydrocarbons from synthesis gas. More particularly, this invention relates to a gas-agitated multiphase reactor system with multiple reaction zones comprising gas-liquid or gas-liquid-solid mixtures that can maximize the production rate while allowing better control of the temperature distribution and better control of the liquid and solid phases in the reactors. Still more particularly, this invention relates to a method for operating a pair of linked gas-agitated slurry bed reactors such that the hydrodynamic behavior and reactor performance of such reactor system are improved compared to that of a conventional slurry bed reactor.

BACKGROUND

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of an amount of gas is so much greater than the volume of the same number of gas molecules in a liquefied state, the process of transporting natural gas typically includes chilling and/or pressurizing the natural gas in order to liquefy it. However, this contributes to the final cost of the natural gas.

Further, naturally occurring sources of crude oil used for liquid fuels such as gasoline, jet fuel, kerosene, and diesel fuel have been decreasing and supplies are not expected to meet demand in the coming years. Fuels that are liquid under standard atmospheric conditions have the advantage that in addition to their value, they can be transported more easily in a pipeline than natural gas, since they do not require liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen, or steam, or a combination of both to form synthesis gas, which is a combination of carbon monoxide gas and hydrogen gas. In the second transformation, known as the Fischer-Tropsch (FT) synthesis, carbon monoxide is reacted with hydrogen to form organic molecules containing carbon and hydrogen. Those molecules containing only carbon and hydrogen are known as hydrocarbons. Those molecules containing oxygen in addition to carbon and hydrogen are known as oxygenates. Hydrocarbons having carbons linked in a straight chain are known as aliphatic hydrocarbons and are particularly desirable as the basis of synthetic diesel fuel.

The Fischer-Tropsch process is commonly facilitated by a catalyst. Catalysts desirably have the function of increasing the rate of a reaction without being consumed by the reaction. Common catalysts for use in the Fischer-Tropsch process contain at least one metal from Groups 8, 9, or 10 of the Periodic Table (in the new IUPAC notation, which is used throughout the present specification). The molecules react to form hydrocarbons while confined on the surface of the catalyst. The hydrocarbon products then are desorbed from the catalyst and can be collected. H. Schulz (Applied Catalysis A: General 1999, 186, p. 3) gives an overview of trends in Fischer-Tropsch catalysis.

The catalyst may be contacted with synthesis gas in a variety of reaction zones that may include one or more reactors, either placed in series, in parallel or both. Common reactors include packed bed (also termed fixed bed) reactors and slurry bed reactors. Originally, the Fischer-Tropsch synthesis was carried out in packed bed reactors. These reactors have several drawbacks, such as temperature control, that can be overcome by gas-agitated slurry reactors or slurry bubble column reactors. Gas-agitated multiphase reactors comprising catalytic particles sometimes called "slurry reactors", "slurry bed reactors" or "slurry bubble column reactors," operate by suspending catalytic particles in liquid and feeding gas reactants into the bottom of the reactor through a gas distributor, which produces small gas bubbles. As the gas bubbles rise through the reactor, the reactants are absorbed into the liquid and diffuse to the catalyst where, depending on the catalyst system, they are typically converted to gaseous and liquid products. The gaseous products formed enter the gas bubbles and are collected at the top of the reactor. Liquid products are recovered from the suspending liquid by using different techniques like filtration, settling, hydrocyclones, magnetic techniques, etc. Some of the principal advantages of gas-agitated multiphase reactors or slurry bubble column reactors (SBCRs) for the exothermic Fischer-Tropsch synthesis are the very high heat transfer rates, and the ability to remove and add catalyst online. Sie and Krishna (Applied Catalysis A: General 1999, 186, p. 55) give a history of the development of various Fischer Tropsch reactors.

It is clear from the prior art that the performance of a SBCR is a combined result of reaction kinetics, heat and mass transfer, and multiphase hydrodynamics. Jackson, Torczynski, Shollenberger, O'Hern, and Adkins (Proc. Annual Int. Pittsburgh Coal Conf. 1996, $13^{th}$ (Vol 2), p. 1226) showed experimental evidence of the increase of gas bold up with increase in the inlet superficial velocity in a SBCR for Fischer Tropsch synthesis. Krishna, DeSwart, Ellenberger,. Martina, and Maretto (AIChE J. 1997, 43(2), p. 311) measured experimentally the increase in gas holdup with an increase in the gas velocity and solids concentration in a slurry bubble column in churn turbulent regime. Letzel, Schouten, Krishna and van den Bleek (Chem. Eng. Sci 1999, 54, p. 2237) developed a simple model for gas holdup and mass transfer at high pressure in a slurry bubble column. Numerically, Sanyel, Vasquez, Roy, and Dudukovic (Chem. Eng. Sci. 1999, 54, p. 5071) and Pan, Dudukovic, and Chang (Chem. Eng. Sci. 1999, 54, p. 2481) showed examples of computational fluid dynamic modeling and optimization of a slurry bubble column reactor irrespective of the chemistry. Wu and Gidaspow, (Chem. Eng. Sci 2000, 55, p. 573) show examples of computational fluid dynamics simulations of hydrodynamics of Slurry Bubble Column processes.

Much previous work has been aimed at optimization of the slurry bubble column system for Fischer Tropsch and other chemistries. Stern et al. (Ind. Eng. Chem. Process Des. Dev. 1985 25, p. 1214) developed an axial dispersion model for describing the performance of gas agitated multiphase reactor used for Fiscber-Tropsch synthesis. Saxena (Cat. Rev.—Sci. Eng. 1995, 37, p. 227) gives a review of the detailed experimental findings and theoretical models for the design of a Fischer Tropsch SBCR.

Considerable patent literature examines optimization of Fischer Tropsch Slurry Bubble Column reactors (SBCRs). U.S. Pat. No. 5,252,613 presents a method for improving catalyst particle distribution by introducing a secondary suspending fluid. U.S. Pat. No. 5,348,982 discloses one mode of operation for an SBCR. U.S. Pat. No. 5,382,748 shows the use of a vertical downcomer to promote the uniform catalyst distribution. U.S. Pat. No. 5,961,933 and U.S. Pat. No. 6,060,524 disclose that optimal operation can be obtained by introduction of liquid recirculation. Despite the significant level of research, there remains a need for an optimized Fischer Tropsch reactor and reactor configuration.

It is noted by Deckwer (Chem. Eng. Sci. 1976, 31, p. 39) that the gas dispersion is important in bubble columns of diameters greater than 0.5 m, as it may have a strong influence on conversion. It is found that the gas dispersion is a function of the gas holdup, superficial gas velocity, and reactor diameter. In the gas-liquid-solid three-phase reactor, the gas holdup depends on many factors such as gas and liquid velocities, gas distributor design, column geometry, physical properties of the gas and liquid, particle concentration, and reactor internals. Therefore, the gas dispersion coefficient is also a complicated function of these design and operating parameters. Usually, it is necessary to perform an in situ measurement to determine the dispersion coefficient at a given condition.

It is known that the flow patterns of individual phases can affect the reactor performance. Plug flow and well-mixed flow are two extreme flow patterns for reactor systems. In plug flow, there is no backmixing within the reactor, and the composition of the reactants varies with the position within the reactor. By contrast, in a well-mixed system, the composition of the slurry is similar at every point within the reactor. The dimensionless Peclet number, Pe, can be used to represent the degree of backmixing in plug flow. In general, it can be said that higher Peclet numbers indicate less backmixing, i.e. approaching plug flow, while better-mixed flow regimes are associated with lower Peclet numbers. Hence, the highest Peclet numbers will occur when flow in the reactor approximates plug flow.

A Peclet number can be calculated for each phase in a slurry bubble column reactor. Thus, the type of flow of the gas phase in the reactor can be described by the gas Peclet number, which has the form $Pe_G = U_G L / D_G$, where $U_G$ is the superficial gas velocity, L is the expanded slurry bed height, and $D_G$ is the gas dispersion coefficient. Superficial gas velocity is defined herein as the total inlet gas volumetric flow rate at reactor inlet temperature and pressure divided by the cross sectional area of the reactor vessel excluding the area occupied by any internals and is sometimes referred to a "inlet superficial gas velocity." The gas dispersion coefficient, $D_G$, is a function of the superficial gas velocity, gas holdup, and the reactor diameter. For large scale industrial bubble columns, the axial dispersion coefficients of gas and liquid phases can be calculated using correlations proposed by Field and Davidson (Trans. IChemE 1980, 58, p. 228). The change of the gas Peclet number with the superficial gas velocity at three reactor aspect ratios is shown in FIG. 1. As shown in FIG. 1, the gas Peclet number decreases with the increase of the superficial gas velocity for a given reactor aspect ratio, defined by the ratio of reactor height over reactor diameter (L/D). Field and Davidson's article also presents the correlation for the liquid Peclet number in bubble columns with liquid circulation. The liquid Peclet numbers for the conjoined reactor system of this invention are calculated using these correlations, and the results are presented in FIG. 2. FIG. 2 shows the liquid Peclet number changes with the superficial gas velocity at two liquid circulation velocities. The liquid circulation velocity is defined as the liquid linear velocity in a reaction zone. In the figure, solid lines show the results with positive liquid velocity which corresponds to the upward liquid flow while dash lines show the results with negative liquid velocity which corresponds to the downward liquid flow. It has been found that Fischer-Tropsch fluidized bed reactors operating at conditions approaching plug flow regime typically provide higher productivity for a given gas superficial velocity than reactors operating with a higher degree of backmixing. However the FT slurry bed reactors operating at conditions approaching plug flow regime typically are at low superficial gas velocities and tend to suffer from uneven distribution of the gas, liquid and solid phases and difficulty of temperature control. In particular, one characteristic of many conventional slurry Fischer-Tropsch reactors is that the flow through the reactor tends to have core-annular characteristics in that an outer, annular region of the reactor will have a much lower gas content than that in the inner region. This core-annular flow reduces the effective volume of the reactor because the entire reactor is not operating at the most efficient reaction conditions. The existence of a core-annular flow also causes an accumulation of water in annular regions of the reactor. Further details relating to Peclet number can be found in co-pending and commonly owned U.S. patent application Ser. No. 10/023,258 filed Dec. 14, 2001, and entitled "Slurry Bed Reactor Operated in Well-Mixed Gas Flow Regime," which is incorporated herein by reference.

Hence, despite significant research in the field of fluidized bed reactors, a need persists for a reactor system that will provide high productivity while also providing more even distribution of its gas, solid and liquid phases and allowing a high degree of temperature and reaction control.

SUMMARY OF THE INVENTION

It is believed that a significant improvement in the operation of fluidized bed reactors for Fischer-Tropsch synthesis is achievable using the concepts disclosed herein. The present invention provides a pair of fluidized bed reaction zones of relatively similar heights that are in fluid communication with each other. More specifically, two distinct reaction zones having separate slurry beds are coupled by a pair of fluid flow passages that allow fluid to circulate between the reactors. One fluid flow passage is positioned in the upper half of the expanded slurry beds. The second fluid flow passage is positioned in the lower half of the slurry beds. Apart from the provided fluid flow passages, of which there may be more than two, the reaction zones are preferably not in fluid communication. Nonetheless, they may be in physical and/or thermal contact with each other. For example, two reaction zones may comprise two complete reactors or, may comprise two zones defined within a single reactor by means of a divider. Likewise, one reaction zone may surround another reaction zone.

Regardless of the configuration of the reaction zones, by feeding gas into one of the reaction zones at a greater rate than into the second reaction zone, the volume fraction of gas in the first reaction zone, known as the gas holdup, can be made greater than the gas holdup in the second reaction zone. The difference in gas holdup values, in turn, causes a difference in slurry density between the two reaction zones. Because the slurry beds are approximately at the same height, the difference in slurry density will result in the hydrostatic pressure at the bottom of the second reaction zone being greater than the hydrostatic pressure at the bottom of the first reaction zone. This difference in hydrostatic pressures will cause fluid at the bottom of the second reaction zone to flow into the bottom of the first reaction zone. Finally, fluid leveling between the two reaction zones will cause fluid at the top of the first reaction zone to flow into the top of the second reaction zone. By controlling the flow rates of gas through the two reaction zones and of fluid between the reaction zones, the hydrodynamic behavior of such reactor system and the reactor performance are improved compared to that of a conventional gas-agitated slurry bed reactor.

In some embodiments, the conjoined reaction zones are operated such that the liquid and solid phases in each reaction zone exhibit less backmixing than gas phase, while the gas in each reaction zone is maintained in a well-mixed flow regime. More specifically, the present gas-agitated multiphase reactor system comprising two conjoined reaction zones can be operated such that the dimensionless gas Peclet number, calculated as described, is less than 0.2 and more preferably less than 0.175. At the same time, the solid and liquid Peclet numbers defined by $Pe_S=U_GL/D_S$ and $Pe_L=U_GL/D_L$ (where $D_S$ and $D_L$ are dispersion coefficients for solid and liquid phases, respectively) are preferably large enough to ensure less backmixing for those phases. In any event, the solid and liquid Peclet numbers are preferably greater than 0.2, more preferably greater than 0.4, and still more preferably greater than 0.6. In still further embodiments, the reactor system may be operated such that the single per-pass CO conversion is between about 35% to 75%.

Hence, a preferred embodiment of the present invention provides a method for the synthesis of hydrocarbons using solid catalysts in a three-phase reactor that gives high catalyst productivity and reactor capacity. The invention provides a design and method for operating a gas-agitated multiphase reactor system comprising two reaction zones, in which the difference in gas superficial velocities is between about 2 to about 45 cm/s. In accordance with various preferred embodiments, the present reactor system comprises at least one reactor stage with recycle or multiple reactor stages, with water stripping and catalyst/wax separation units shared between pairs or groups of reaction zones.

The present invention provides a novel gas-agitated reactor apparatus for gas-liquid or gas-liquid-solid multiphase synthesis comprising two reaction zones of relatively similar heights that are in fluid communication with each other achieved by at least one pair of fluid flow passages that allow a circulation of fluid between the reaction zones. The fluid circulation results in a more uniform distribution of the solids concentration (when applicable), and/or a more even temperature distribution along the axial direction. Additionally the fluid circulation between the two vessels introduces a forced convection, and hence increases the heat transfer coefficient and reduces the heat transfer surface area necessary for either heating or cooling.

Thus, the present invention provides a gas-agitated multiphase reactor system that is effective for enhancing reactor productivity and improving temperature control. For a synthesis using a catalyst as a solid phase, and having reactant (s) and product(s) in gas-liquid phases, this conjoined gas-agitated reactor system minimizes the difference in axial catalyst concentration and in particular for a Fischer-Tropsch synthesis, it lowers the maximum local water concentration therefore lowering catalyst deactivation rate.

According to one preferred embodiment a method for producing hydrocarbonaceous products from synthesis gas in a multiphase catalytic system comprises (a) providing a reactor system comprising separate first and second reaction zones, each reaction zone comprising a liquid phase and a solid phase containing a catalyst, the first and second reaction zones being in fluid communication with each other via a lower fluid flow passage and an upper fluid flow passage, the each flow passage having an inlet and an outlet; (b) feeding a first gas comprising $H_2$ and CO into the bottom of the first reaction zone and a second gas comprising $H_2$ and CO into the bottom of second reaction zone such that the superficial gas velocity in the first reaction zone is greater than the superficial gas velocity in the second reaction zone and a pressure differential exists across at least the lower fluid flow passage; (c) creating a liquid circulation from the first reaction zone through the upper fluid flow passage to the second reaction zone and from the second reaction zone through the lower fluid flow passage to the first reaction zone by the pressure differential; and (d) controlling the liquid circulation to achieve a desired liquid circulation velocity.

The resulting slurry circulation velocity is preferably between 0.5 and 20 cm/s. In a particularly preferred embodiment, slurry flows up through the first reaction zone, into the second reaction zone through the upper fluid flow passage, down through the second reaction zone and into the first reaction zone via the lower fluid passage. This fluid circulation patter may be maintained substantially continuously during operation or may be intermittent. The superficial gas velocity in the first reaction zone is preferably between 17 and 60 cm/sec and/or between 2 cm/s and 45 cm/s greater than the superficial gas velocity in the second reaction zone. The superficial gas velocity in the second reaction zone is preferably between 15 and 58 cm/s. The difference in superficial gas velocities between the two reaction zones can be adjusted, such as by adjusting a valve in at least one of the fluid flow passages.

The reactor system preferably contains a Fischer-Tropsch catalyst and water can be removed from the reactor system if desired. Portions of the first and second gases may be converted to hydrocarbonaceous products, which may be removed from the reactor system.

In another embodiment, a gas-agitated reactor system for generating products from a reactant gas comprises a first reaction zone, a second reaction zone, a first fluid flow passage having an inlet and an outlet and providing fluid communication between the first and second reaction zones, a second fluid flow passage having an inlet and an outlet and providing fluid communication between the first and second reaction zones, and at least one gas feed system for feeding a reactant gas into the first and second reaction zones at different superficial gas velocities. The first and second reaction zones preferably contain at least one reaction in common. The first fluid flow passage inlet is preferably placed in the upper half of the first reaction zone and the first fluid flow passage outlet is preferably placed in the upper half of the second reaction zone. Likewise, the second fluid flow passage inlet is preferably placed in the lower half of the first reaction zone and the second fluid flow passage outlet is preferably placed in the lower half of the second reaction zone. The first and second reaction zones are preferably substantially of similar height. The first fluid flow passage is preferably positioned at an angle of between 0 and 70 degrees with respect to a horizontal plane and the second fluid flow passage is preferably positioned at an angle of between 0 and 70 degrees with respect to a horizontal plane.

The reactor system can include an external circulation loop, such as one that comprises a product recovery system, a byproduct removal system, or a regenerator unit. The reactor system can further comprise a flow-controlling valve on at least one of the first and second fluid flow passages. At least one of the first and second fluid flow passages may include a turbulence-inducing internal structure and/or gas collection system in fluid communication with the reaction zones.

According to still another embodiment, a reactor system for producing hydrocarbons from syngas in a three-phase catalytic system in which the catalyst is suspended in a slurry comprises a first reaction zone containing a portion of the slurry, a second reaction zone containing a portion of the slurry, a lower fluid flow passage providing fluid communication between the first and second reaction zones, the lower flow passage having an inlet and an outlet, an upper fluid flow passage providing fluid communication between the first and second reaction zones, upper lower flow, passage having an inlet and an outlet, and at least one gas feed system for feeding syngas into the first and second reaction zones at different inlet superficial space velocities. The rate of flow of gas into the first and second reaction zones is preferably such that the gas Peclet number in each zone is less than about 0.175. Alternatively or in addition, the rate of flow of gas into the first and second reaction zones may be such that the gas Peclet number in each reaction zone is less than about 0.175 and the liquid and solid Peclet numbers in each zone are each greater than about 0.2.

The flow of gas into the first and second reaction zones is such that slurry flows up through the first reaction zone, into the second reaction zone through the upper fluid flow passage, down through the second reaction zone and into the first reaction zone via the lower fluid passage.

In still another embodiment, a reactor system for producing hydrocarbons from syngas in a three-phase catalytic system in which the catalyst is suspended in a slurry, comprises a first reaction zone containing a portion of the slurry, a second reaction zone separated from the first reaction zone and containing a portion of the slurry, an upper fluid flow passage providing fluid communication between the first and second reaction zones, the upper flow passage having an inlet and an outlet, upper and lower fluid flow passages providing fluid communication between the first and second reaction zones, each flow passage having an inlet and an outlet, at least one gas feed system for feeding syngas into the first and second reaction zones at different inlet superficial space velocities, a water-stripping apparatus in fluid communication with at least one of the reaction zones, a liquid product removal system in fluid communication with at least one of the reaction zones, and a gas collection system in fluid communication with the reaction zones. As above, the superficial gas velocity in the first reaction zone may be at least 2 cm/sec greater than the inlet superficial gas velocity in the second reaction zone and/or the rate of flow of gas into the first and second reaction zones may be such that the gas Peclet number in each zone is less than about 0.175.

BRIEF DESCRIPTION OF THE DRAWINGS

For a detailed description of the preferred embodiments of the present invention, reference will now be made to the accompanying Figures, wherein.

DETAILED DESCRIPTION OF A PREFERRED EMBODIMENT

Figure 1:
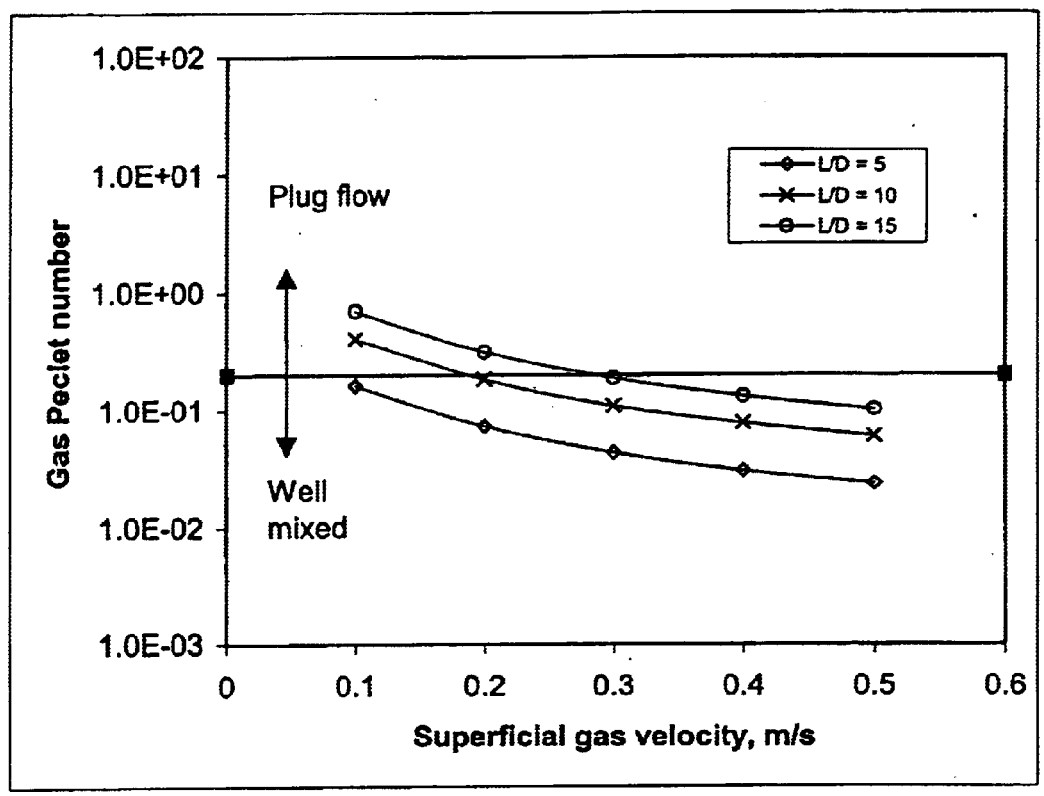
FIG. 1 is a plot illustrating the change in gas Peclet number with the superficial gas velocity at different reactor aspect ratios.
Figure 2:
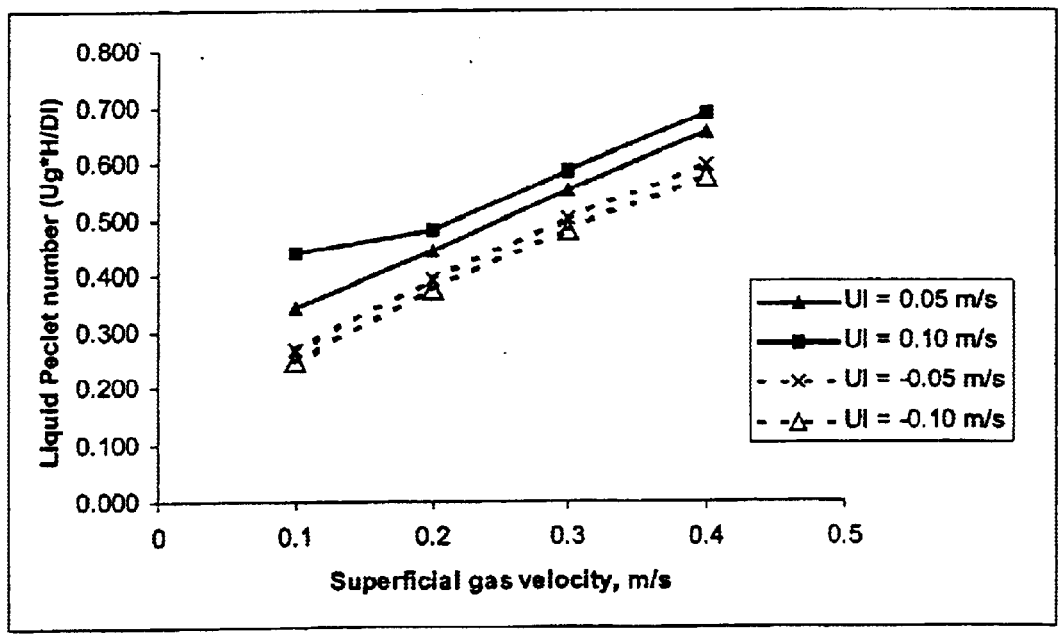
FIG. 2 is a plot illustrating the change in liquid Peclet number with the superficial gas velocity at different liquid circulation velocities.

It has been discovered that, in a gas-agitated multiphase reactor containing a mixture of gas, liquid, and solid, control and productivity of the reactor system can be enhanced by operating a two-zone reactor system such that there is a significant amount of slurry circulation between two reaction zones. This slurry circulation between reaction zones leads to a more uniform distribution of the solid concentration along the reactor and/or a more uniform temperature distribution along the reactor axial direction, therefore to the possibility of using a higher operating temperature for both reaction zones. The slurry circulation also introduces a forced convection, and hence increases the heat transfer coefficient and reduces the heat transfer surface area necessary for either heating or cooling. Another advantage is the reduction in the local maximum concentration of some undesirable by-products, for example, water in the case of a Fischer-Tropsch synthesis. The use of conjoined reaction zones also can provide some cost savings by reducing the number of the liquid-solid separation units, condensers, catalyst regenerators, water stripping units and/or recycle compressors. The slurry circulation in the conjoined reactor system is created by introducing a gas phase to both reaction zones with different superficial gas velocities, such that the superficial gas velocities preferably differ between about 2 and 45 cm/s.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Reactor System

Figure 3:
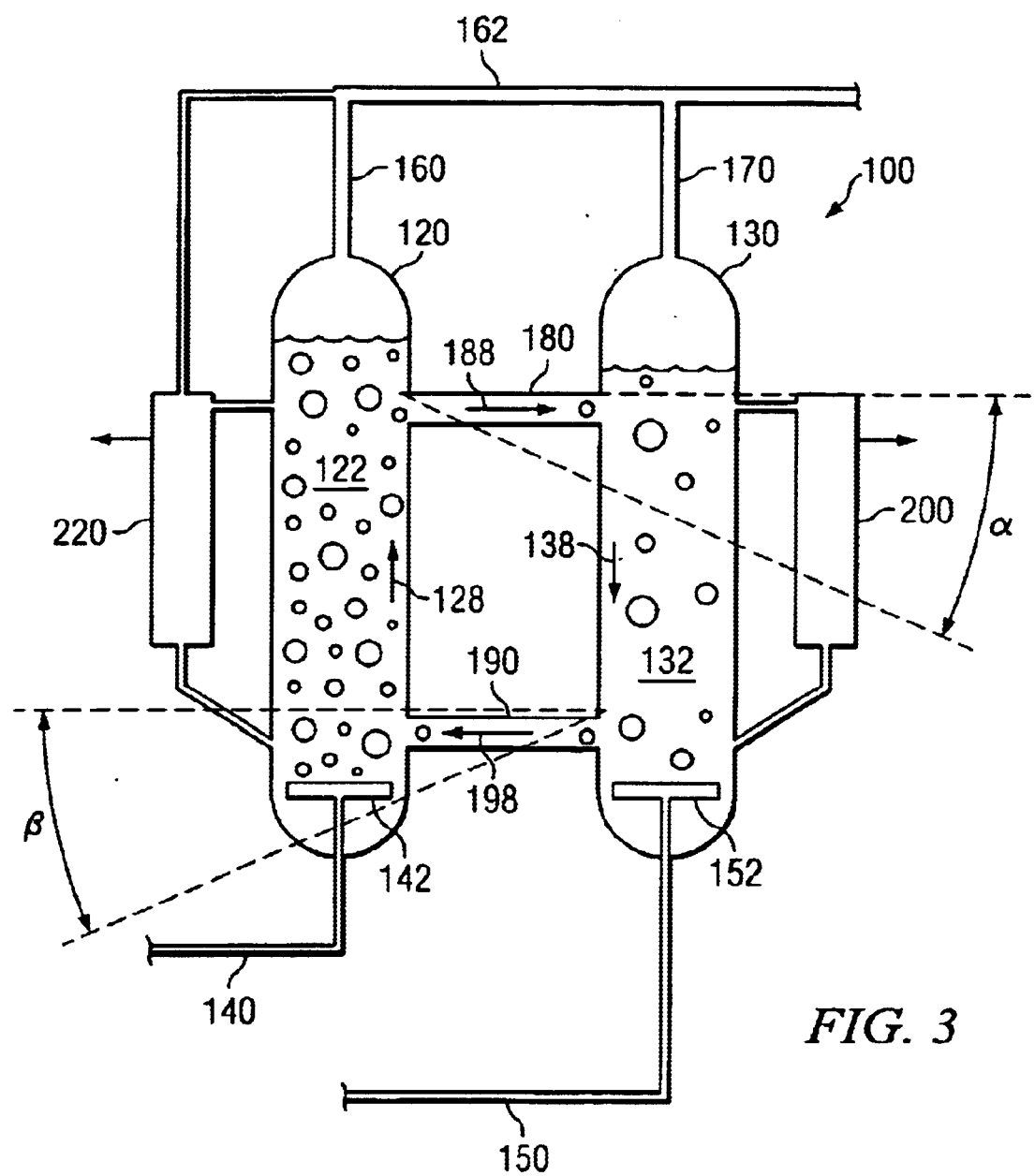
FIG. 3 is a schematic illustration of a conjoined reactor system according to a preferred embodiment of the present invention.

Referring now to FIG. 3, one embodiment of a preferred reactor system 100 includes a first reaction zone 120 and a second reaction zone 130. Each reaction zone 120, 130 contains a slurry bed 122, 132, respectively. Reaction zone 120 is provided with a gas feed line 140, which provides gas to a gas distribution unit 142 near the bottom of the slurry bed 122, and a gas exit line 160. Similarly, reaction zone 130 is provided with a gas feed line 150, which provides gas to a gas distribution unit 152 near the bottom of the slurry bed 132, and a gas exit line 170. Gas exit lines 160, 170 each flow into overhead gas line 162. While gas distribution units 142, 152 are preferably located near the bottom of their respective slurry beds, it may in some instances be desirable to position them elsewhere, or to provide addition gas distribution units that are positioned at other elevations within the slurry bed. If gas distribution units are provided at a plurality of levels, the rate of gas feed at those different levels can be controlled as desired so as to provide desired levels of gas holdup and slurry density.

Each reaction zone 120, 130 preferably further includes a heat transfer unit (not shown) through which a cooling or heating medium is pumped so as to remove the heat generated by the reactions or add heat to the reactions in the reaction zones. As is known in the art, each heat transfer unit can comprise coils or tubes, and can be placed internally or externally. Any suitable heat transfer device such as are known in the art or multiple heat transfer units can be used to achieve the desired cooling or heating of a gas-agitated slurry reactor.

In preferred embodiments, reactor system 100 includes a water stripping device 220, such as are known or may be developed in the art, and a wax/catalyst separation system 200, such as are known or may be developed in the art. While water stripping device 220 is shown in fluid communication with reaction zone 120 and wax/catalyst separation system 200 is shown in fluid communication with reaction zone 130, it will be understood that these connections could be altered or reversed without deviating from the scope of the invention. Likewise, either water stripping device 220 or wax/catalyst separation system 200 can be duplicated or replaced with an alternative device. In addition, each reaction zone 120, 130 could have its own water stripping device 220 and wax/catalyst separation system 200.

Still referring to FIG. 3, in a preferred embodiment, reaction zones 120 and 130 are coupled by a pair of fluid flow passages 180, 190, which may comprise pipes, as shown, or any other suitable fluid communication device. Fluid flow passages 180, 190 may include optional valves, meters, impellers, or the like (not shown) to control flow rate and/or maintain solid suspension (i.e., prevent solid deposition). Upper fluid flow passage 180 is preferably positioned in the upper half of the two reaction zones 120, 130 and lower fluid flow passage 190 is preferably positioned in the lower half of the two reaction zones 120, 130. It is preferred but not necessary that the bottoms of the two reaction zones 120, 130 be at approximately the same level.

In one embodiment, pipes 180, 190 are inclined with respect to the horizontal by angles of $\alpha$ and $\beta$, respectively, as illustrated by the dashed lines in FIG. 3. This embodiment is particularly preferred when a solid phase is present in the reactor system. Alternatively, pipes 180, 190 can be substantially horizontal as shown. If inclined pipes are used, the angle a of pipe 180 is preferably measured with respect to a plane normal to the axis of reaction zone 120 and is preferably between 0 and 70 degrees. Similarly, the angle $\beta$ of pipe 190 is preferably measured with respect to a plane normal to the axis of reaction zone 130 and is preferably between 0 and 70 degrees. The selection of the angles for each pipe will depend on the distance between reaction zones (the greater the distance, the smaller the angles), the presence and physical properties of the solid particles (i.e., settling velocity) and/or mechanical limitations. If horizontal pipes are used, it is possible to reverse the roles of reaction zones 120 and 130 if desired.

In some embodiments, it may be desired to provide one or more catalyst/wax separation devices in conjunction with one or both fluid flow passages 180, 190. For example, one portion of the wall of a fluid flow passage may include one or more filter elements, such as for example a porous membrane, that allows fluid to be withdrawn while leaving solid particles in the reactor system. Likewise, water stripping can occur in conjunction with the fluid flow passages. These can be in addition to or in place of the water stripping device 220 and wax/catalyst separation system 200 described above.

As stated above, in certain embodiments of the present reactor system, while the circulation of the slurry produces a flow pattern in the liquid and solid phases that exhibits less backmixing than would be the case in an equivalent system comprised of only one reaction zone, the gas phase is still in the well-mixed regime. In some embodiments, it is preferred that the difference in slurry densities resulting from the different gas holdup values, when combined with the height of the two slurry beds 122, 132, produce a pressure differential such that the linear slurry velocity in the reaction zones 122 and 132 is between about 0.5 cm/s and 20 cm/s and the linear rate of flow of the slurry through lower fluid flow passage 190 is between about 3 cm/s and 6 m/s. Alternatively, the rate of gas feed into each reaction zone can be controlled such that the superficial gas velocity in the first reaction zone is between 17 and 60 cm/sec, the superficial gas velocity in the first reaction zone is between 2 cm/s and 45 cm/s greater than the superficial gas velocity in the second reaction zone, and/or the superficial gas velocity in the second reaction zone is between 15 and 58 cm/s.

It will be understood that the construction of the reaction zones and the reactor system as a whole can be varied without departing from the principles set forth herein. Referring briefly to FIGS. 9–14, in which the unfilled block arrows indicate the direction of gas flow and the filled block arrows indicate the direction of slurry or liquid, the reaction zones can comprise adjacent chambers in a single housing and/or can comprise three or more chambers with flow circulating between adjacent chambers. Likewise, instead of pipes, fluid communication between adjacent chambers can be provided by any suitable means, including partial walls, perforations (not shown), valves (not shown), or the like.

Operation

Figure 4:
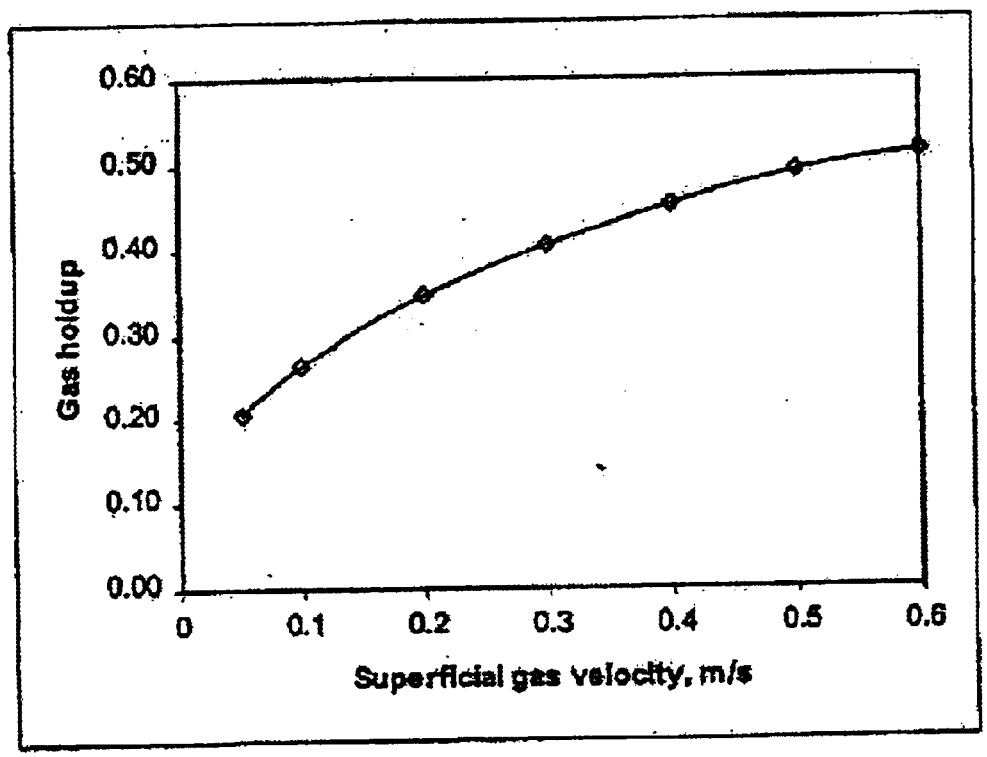
FIG. 4 is a plot illustrating increasing gas holdup with increasing of superficial gas velocity.

In operation, feed gas is pumped into each reaction zone via gas distribution units 142, 152. The rate of flow of gas through gas distribution unit 142 into first reaction zone 120 is greater than the rate of flow of gas through a gas distribution unit 152 into second reaction zone 130. Referring briefly to FIG. 4, and as illustrated therein, a high gas flow rate corresponds to a high superficial gas velocity, which in turn causes a high gas holdup in the reactor expanded bed, as shown in slurry bed 122. These results are generated based on the correlations presented by Krishna and Sie (Fuel Processing Technology, 2000, 64, p. 73). Typical Fischer-Tropsch reaction conditions are used with a temperature of 220° C., pressure of 2859 kPa (400 psig). The catalyst weight fraction in the slurry phase is about 30%. Increased gas holdup tends to increase the expanded bed volume in the reaction zone. In a preferred operation, the gas flow rate into the first reaction zone 120 is in the range of 17 to 60 cm/s and is approximately 2 to 45 cm/s greater than the gas flow rate into second reaction zone 130. Correspondingly, then, the gas holdup (calculated as a percentage of gas volume in the expanded slurry bed volume) in first reaction zone 120 is preferably approximately 2 to 30 volume percent in absolute value greater than the gas holdup in second reaction zone 130.

Referring again to FIG. 3, the greater gas holdup in reaction zone 120 reduces the density of slurry bed 122 relative to slurry bed 132. Because slurry bed 122 and slurry bed 132 are roughly the same height, the hydrostatic pressure at the bottom of slurry bed 122 will be less than the hydrostatic pressure at the bottom of slurry bed 132. This difference in pressures causes fluid to flow from the bottom of reaction zone 130 into the bottom of reaction zone 120 through fluid flow passage 190. This in turn causes the level of the top of slurry bed 122 to rise until the hydrostatic pressure at the inlet to fluid flow passage 180 exceeds the hydrostatic pressure at its outlet in reaction zone 130, whereupon slurry will flow from reaction zone 120 into reaction zone 130 via fluid flow passage 180. For this reason, it is preferred but not necessary that the downstream end of fluid flow passage 180 very near or even slightly above the top of slurry bed 132.

Provided that the gas flows are controlled properly, slurry will circulate continuously from reaction zone 130 into reaction zone 120 via fluid flow passage 190, as shown at 198, and from reaction zone 120 into reaction zone 130 via fluid flow passage 180, as shown at 188. As slurry 122 travels up through vessel 120, as shown at 128, it flows co-currently with reactant gas, bubbles that are injected into vessel 120 by gas distribution unit 142. By contrast, slurry 132 flowing down through vessel 130, as shown at 138, flows counter-currently to the flow of reactant gas bubbles that are injected by gas distribution unit 152.

The circulating flow described herein can be maintained continuously throughout the operating period of the reactor system, or can be intermittent, if it is desired to vary the flow patterns. Similarly, upper or lower flow passage 180 or 190 can be eliminated. For example, in one embodiment, there is no flow through upper fluid flow passage 180. This can occur when the volume of the expanded bed in reaction zone 120 is such that the top of the expanded bed is below the inlet level of upper fluid flow passage 180. In this instance, the two reaction zones can still be operated so as to cause fluid flow through lower fluid flow passage 190. In embodiments where one of the flow passages is absent, slurry flow through the system in the desired flow rate can be maintained by feeding diluent or liquid product recycle or in at one or more locations in the second reaction zone and/or by withdrawing liquid product from the first reaction zone.

Figure 5:
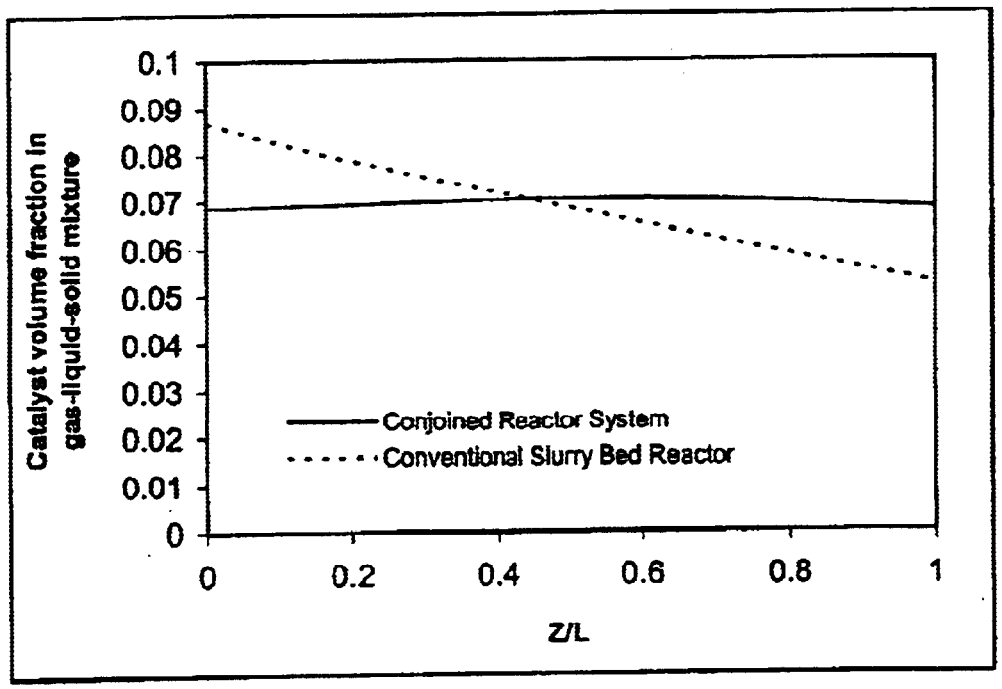
FIG. 5 is a plot showing exemplary solids distributions, given as catalyst weight fraction distributions, along the length of a reactor for a conventional slurry bed reactor and a conjoined multiphase reactor according to one embodiment of this invention.

The present reactor system results in a significant amount of slurry circulation between reaction zones. This leads to a more uniform distribution of the catalyst concentration along the length of each reaction zone. As illustrated in FIG. 5, the solids holdup along the length of each expanded bed is essentially constant in the case of the conjoined reactor system according to this invention, when there is liquid circulation, whereas solids holdup can decrease by more than 30% along the length of the bed in the case of a conventional slurry bed reactor. The uniform distribution of the solids concentration applies both to reactor expanded beds of the conjoined reactor system with upward liquid flow in one expanded bed (with the higher gas superficial velocity) and with downward liquid flow in the other expanded bed due to the continuous flow of the slurry between the reaction zones.

Figure 7:
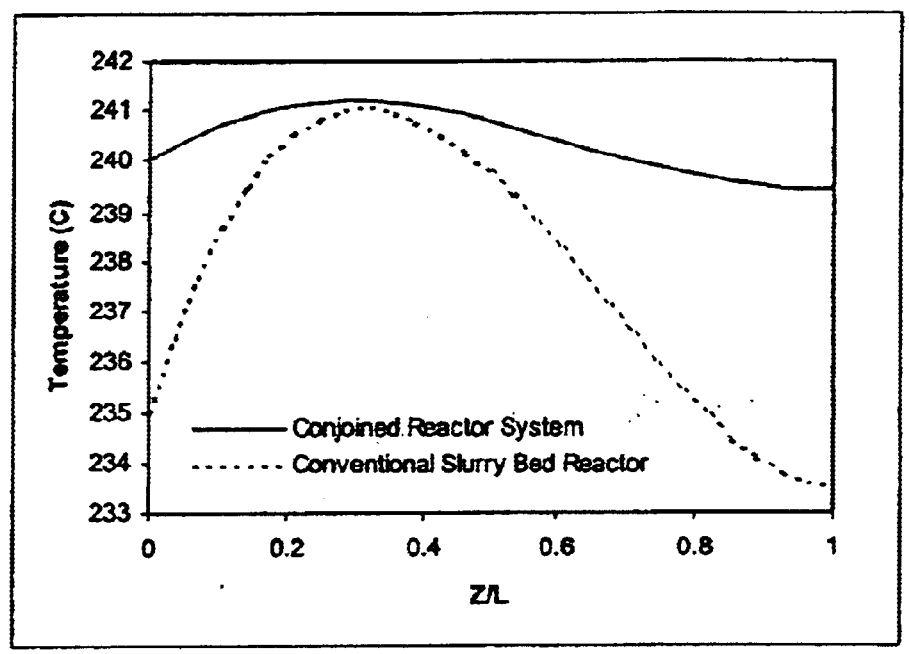
FIG. 7 is a plot illustrating the increase in heat transfer coefficient with increasing liquid circulation velocity.

The circulation of slurry between the reaction zones also increases the forced convection, which increases the heat transfer coefficient. Therefore, the number of the heat transfer tubes required to achieve the same reactor performance is reduced. As reported by Baker et al. (Powder Technology, 1978, 21, p.195), the heat transfer coefficient in three-phase fluidized systems is proportional to the liquid velocity to the power of 0.07. Based on their findings, FIG. 7 illustrates the increase in the heat transfer coefficient in the conjoined reactor system according to this invention, when liquid circulation velocity increases from 0.1 cm/s to 10 cm/s. In conventional slurry bed reactors, the slurry circulation results only from flow through external or internal loops comprising for example one of the external liquid/solid separation systems or similar devices such as the wax/catalyst separation system 200 as shown in FIG. 3 and the slurry circulation velocity is usually less than 0.1 cm/s. In contrast, circulation velocity in the present conjoined reactor system will typically be in the range of from about 0.5 cm/s to 10 cm/s. This increase in circulation velocity results in an increase of 10% to 38% in the heat transfer coefficient, compared to a conventional slurry reactor. Hence, the heat transfer surface area needed i.e., the number of heat transfer tubes or coils can likewise, be reduced by 10% to 38% to achieve similar reactor performance. This principle applies regardless of whether overall slurry flow is upward or downward. Reducing the number of heat transfer tubes or coils can reduce the capital cost significantly.

Figure 6:
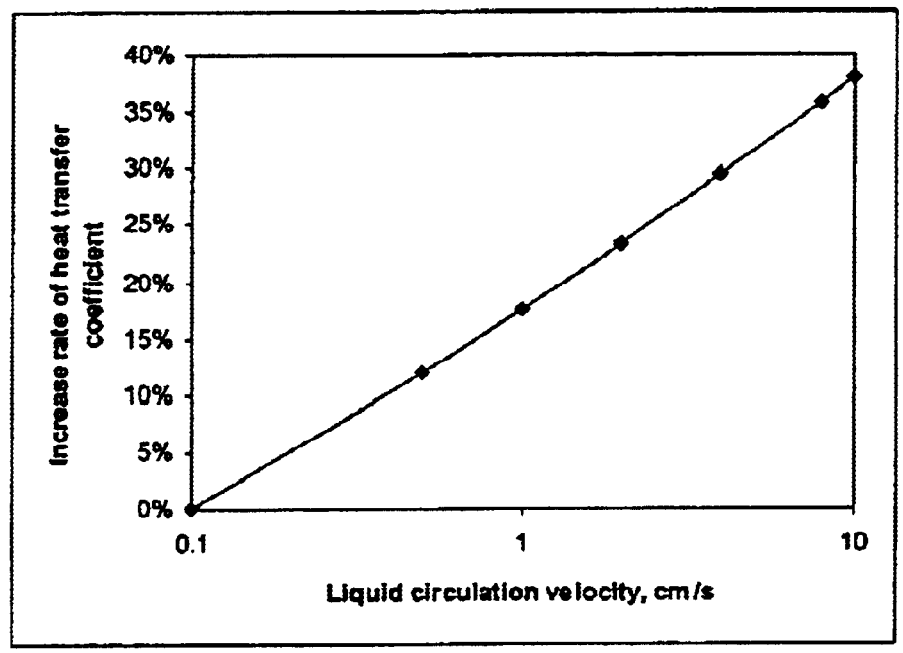
FIG. 6 is a plot showing exemplary temperature distributions along the length of a reactor for a conventional slurry bed reactor and a conjoined multiphase reactor according to one embodiment of this invention.

The deactivation rates of the preferred Fischer-Tropsch synthesis catalysts tend to increase with increases in temperature. Thus, it is typically desirable to maintain the reaction below a maximum temperature above which significant catalyst deactivation occurs. For a given maximum reaction temperature, the reactor can operate at a higher average temperature if the catalyst concentration is uniform within the reactor. As a result, higher conversions can be achieved if slurry circulation is used to maintain a more uniform temperature distribution in addition to a more uniform catalyst concentration. As an example, the temperature distributions along the reactor axial direction for a Fischer-Tropsch synthesis are shown in FIG. 6 for a conventional slurry bed reactor and a conjoined reactor system. As can be seen, the present conjoined reactor systems result in a higher slurry circulation, which in turn produces a much more uniform temperature distribution. In this example, the difference of the average reaction zone temperatures is about 2.5° C., which corresponds to an increase of about 5% in the conversion of carbon monoxide.

Similarly, in Fischer-Tropsch synthesis, the catalyst deactivation rate is related to the water concentration in the slurry. Water is indeed continuously formed during Fisher-Tropsch synthesis. The presence of water limits conversion and prematurely deactivates catalyst systems such as iron and cobalt-based Fisher-Tropsch catalysts (e.g., Schanke et al., Catalysis Letter 1995, 34, p. 269; Hilmen et al., Applied Catalysis 1999, 186, p. 169; van Berge et al., Catalysis Today 2000, 58, p. 321). Thus, a high water partial pressure correlates to a high deactivation rate. In addition, it is believed that above a certain partial pressure of water, the catalyst deactivates faster. For example, some have observed that partial pressures of water above about 6 bar deactivate certain Fischer-Tropsch catalysts, while partial pressures of water below that level do not (Schanke et al., Energy & Fuels 1997, 10, p. 867). It is further believed that the relationship between deactivation rate and water concentration may have one or more thresholds, between which the relationship may or may not be linear. Furthermore, the relationship between deactivation rate and water concentration may depend on other physical parameters of the system. Regardless of the precise nature of the relationship, it is believed that reducing water concentration would reduce the rate of catalyst deactivation. Therefore Fischer-Tropsch catalyst deactivation is minimized when the water concentration is below a certain value.

Figure 8:
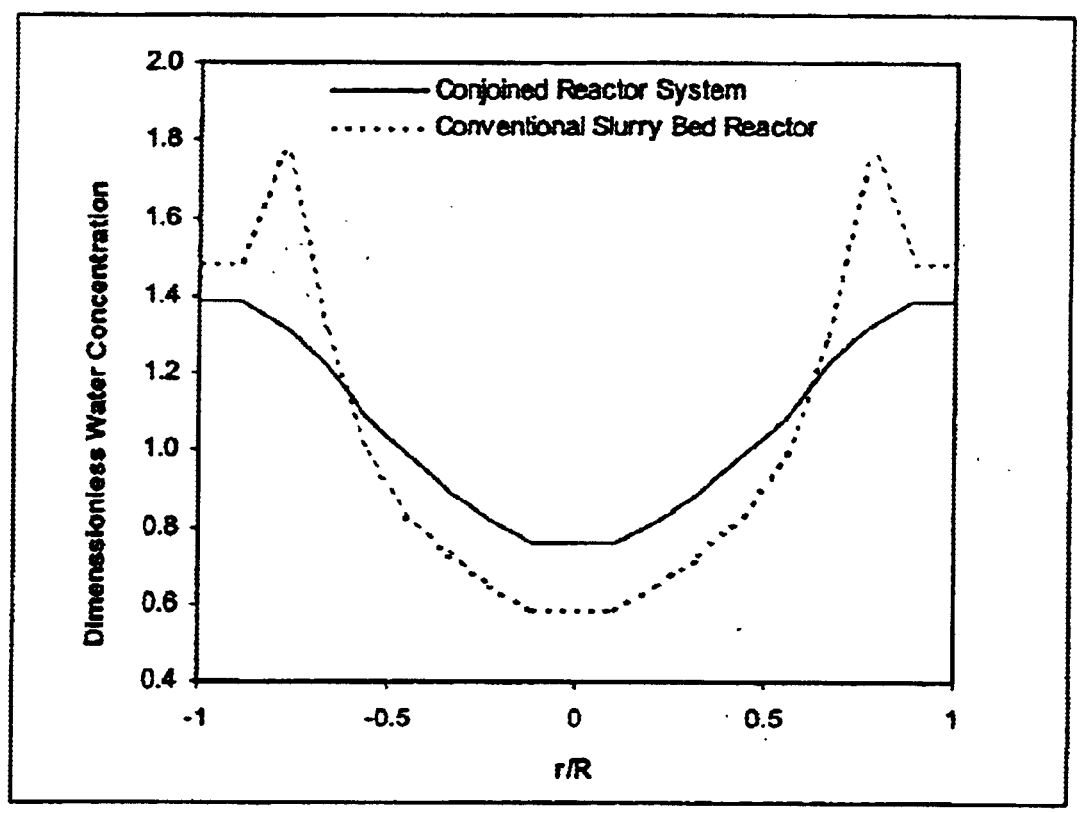
FIG. 8 is a plot illustrating the radial profiles of the dimensionless water concentration at the ¾ of bed height for a conventional slurry bed reactor and a conjoined multiphase reactor according to one embodiment of this invention.

As disclosed in U.S. patent application Ser. No. 10/315,571, filed Dec. 10, 2002 and entitled "Method For Reducing Water Concentration In A Multi-Phase Column Reactor," which is incorporated herein by reference, that the water concentration in the near wall region in the upper half of an expanded slurry bed is significantly higher than in other regions in the reactor. With the slurry circulation afforded by the present invention, a more uniform distribution of water concentration in the liquid phase can be obtained. This also leads to a lower catalyst deactivation and a longer catalyst life. The radial profiles of the dimensionless water concentration at the ¾ of bed height are shown in FIG. 8 for the conventional slurry bed reactor and the conjoined reactor system. The dimensionless water concentration is defined as the local water concentration divided by the average water concentration of the whole reactor. As disclosed in co-owned and co-pending U.S. patent application Ser. Nos. 10/315,571 and 10/193,357, each of which is incorporated herein by reference, the water concentration in the near wall region at the upper half of the expanded slurry bed is significantly higher than in other regions in the conventional slurry bed reactor. In the conjoined reactor system, the slurry circulation increases the mixing in the reactor. As a result, the localized maximum water concentration that occurs in conventional slurry bed reactors is much less prevalent in the conjoined reactor system. As shown in FIG. 8, the maximum water concentration in the conjoined reactor system is much lower than that in the conventional slurry bed reactor.

A preferred use for the reactor system of the present invention is the Fischer-Tropsch synthesis of hydrocarbon using any suitable supported or precipitated catalysts comprising a catalytic metal from Group 8, 9, and 10 of the Periodic Table of the Elements, New Notation, as found in, for example, the CRC Handbook of Chemistry and Physics, $82^{nd}$ Edition, 2001–2002, and used throughout this specification as the reference for all element group numbers. The catalyst preferably contains cobalt, iron, nickel, or ruthenium, and more preferably cobalt, iron, or ruthenium as catalytic metal. For cobalt, the catalyst preferably contains about 5 to 75 wt % cobalt and more preferably from about 10 to about 60 wt % cobalt For iron, the catalyst preferably contains about 10 to 95 wt % iron, and more preferably from about 15 to about 85 wt % iron. For ruthenium, the catalyst preferably contains about 0.5 to about 10 wt % ruthenium and more preferably from about 1 to about 8 wt % ruthenium. The catalyst may contain additionally one or more promoters comprising a metal selected from Group 1-17. A promoter metal is preferably. selected from Group 1 (Li, Na, K), 7 (Re), 8 (Ru, Os), 9 (Co, Rh, Ir), 10 (Ni, Pd, Pt), 11 (Cu, Ag), 13 (B). In some embodiments, it may be desirable to utilize a dual function catalyst By varying the feed gas composition between the vessels, each vessel could contain a different reaction.

If a catalyst support is used, preferably the catalyst support comprise unmodified, stabilized or modified alumina, silica, titania, zirconia, or combinations thereof More preferably the catalyst support comprises a stabilized or modified alumina or silica-alumina Cobalt catalysts have a high activity and selectivity for the Fischer-Tropsch synthesis. The kinetic expression given by Yates and Satterfield (Energy and Fuels 1991, 5, p. 168) can be used to evaluate the performance of a slurry bed reactor.

The reaction zones or chambers may be charged with the same or different feed gas compositions. In a preferred mode of operation, the reaction zones are charged with feed gases comprising hydrogen or a hydrogen source and carbon monoxide. $H_2/CO$ mixtures suitable as a feedstock for conversion to hydrocarbons in the system of this invention can be obtained from light hydrocarbons, such as methane or hydrocarbons comprised in natural gas, by means of steam reforming, auto-thermal reforming, dry reforming, advanced gas heated reforming, partial oxidation, catalytic partial oxidation, or other processes known in the art. Alternatively, the $H_2/CO$ mixtures can be obtained from biomass, and/or from coal by gasification. In addition the feed gases can comprise off-gas recycle from the present or another Fischer-Tropsch process. The hydrogen is preferably provided by free hydrogen, although some Fischer-Tropsch catalysts have sufficient water gas shift activity to convert some water and carbon monoxide to hydrogen and carbon dioxide for use in the Fischer-Tropsch process. It is preferred that the mole ratio of hydrogen to carbon monoxide in the feed be greater than 0.5:1 (e.g., from about 0.67:1 to 2.5:1), preferably from about 1.4:1 to about 2.3:1. The feed gas may also contain carbon dioxide or other compounds that are inert under Fischer-Tropsch reaction conditions, including but not limited to nitrogen, argon, or light hydrocarbons. The feed gas stream preferably contains only a low concentration of compounds or elements that have a deleterious effect on the catalyst. The feed gas may need to be treated to ensure low concentrations of sulfur or nitrogen compounds such as hydrogen sulfide, hydrogen cyanide ammonia and carbonyl sulfides.

The feed gas contacts the catalyst in the slurry bed in each reaction zone. As is known in the art, water partial pressure should be kept to a minimum. The water partial pressure is calculated as the mole fraction of water in the reactor outlet gas multiplied by the total outlet pressure of the reactor in a particular stage. Water may be removed in situ from reactor system 100 by water removal system 220, which can comprise any suitable water removal device, apparatus, or method. Similarly, the reaction product, typically waxy hydrocarbons, must be removed from the reactor system in order to avoid the accumulation of products. Any suitable wax removal and/or other product separation devices or techniques such as are known in the art can be used in wax removal system 200.

In conventional slurry bubble column reactors, each reactor may be equipped with an external liquid/solid separation unit, an internal liquid/solid separation unit, a condenser at the reactor outlet, a catalyst regenerator, a water stripping unit, and/or a recycle compressor. By using conjoined reactors in accordance with the present invention, a single piece of equipment can serve at least two reactors, due to the continuous flow of slurry between two reactors. Using the present conjoined reactors, the number of the external liquid/solid separation units, condensers, catalyst regenerators, water stripping units and recycle compressors can be considerably reduced. Therefore, significant capital saving from the cost reduction in equipment and associated control systems and the operating can be achieved.

Although the use of a suspended catalyst in the conjoined reactor system is a preferred embodiment, it is likely that the main advantages of the conjoined reactor system could be applied with the use of a fixed catalyst or a stationary catalyst phase present in one or more of the reaction zones. The fixed catalyst or the stationary catalyst phase is at least partially disposed in the liquid phase. The fixed catalyst or the stationary catalyst phase can be used on its own or in combination with a suspended catalyst. A stationary catalyst phase is defined by one or more arrangements of monolithic structures, discrete catalyst structures, or combination of both, which are prevented from being suspended by the gas or liquid phases.

In this alternate embodiment when the conjoined reactor system comprises a stationary catalyst phase, the fixed catalyst would not be subjected to the mechanical erosion that increases catalyst attrition, which is typically observed with the suspended catalysts. Hence, catalysts that are not robust enough for slurry bed or gas-agitated reactors can be used in the present system. The stationary catalyst phase preferably includes a catalyst active for converting synthesis gas to hydrocarbons, such as a Fischer-Tropsch catalyst. In some embodiments the stationary catalyst phase may include a catalyst active for alcohols synthesis or unsaturated hydrocarbons synthesis reactions. In addition when the conjoined reactor system comprises only one or more stationary catalyst phases, the product recovery unit is simplified and the need of liquid/solid separation is not necessary.

Figure 9:
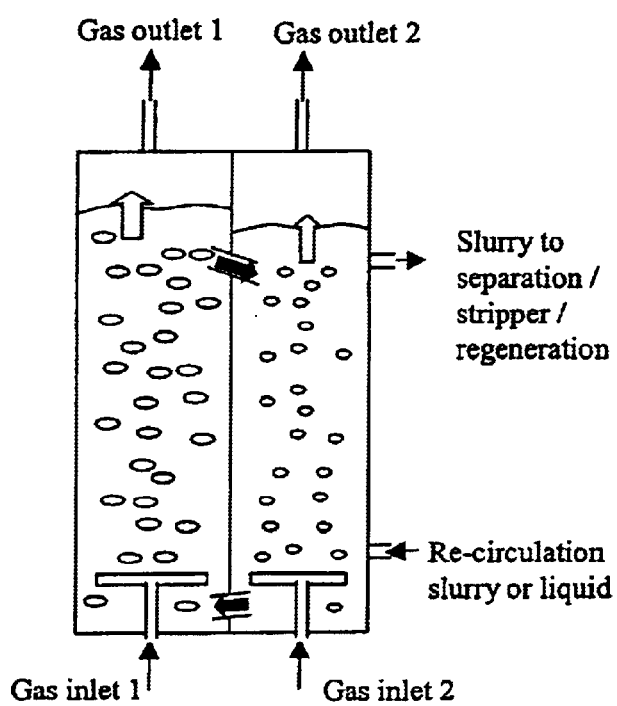
FIGS. 9–14 are schematic diagrams showing various alternative embodiments reactor systems constructed in accordance with the principles of the present invention.
Figure 10:
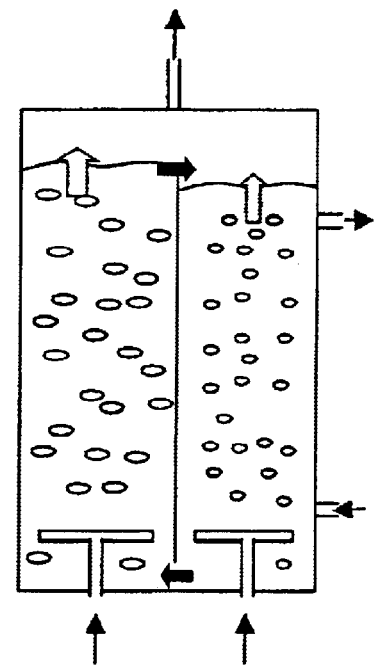
Figure 11:
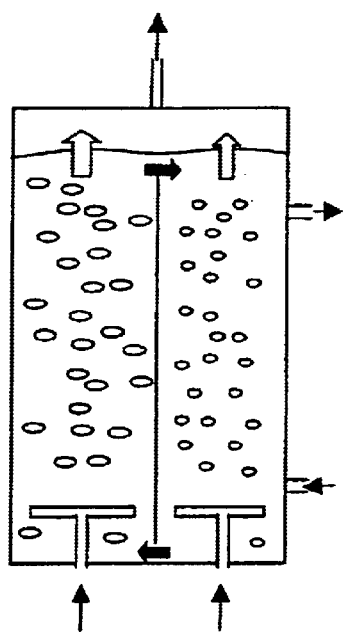
Figure 12:
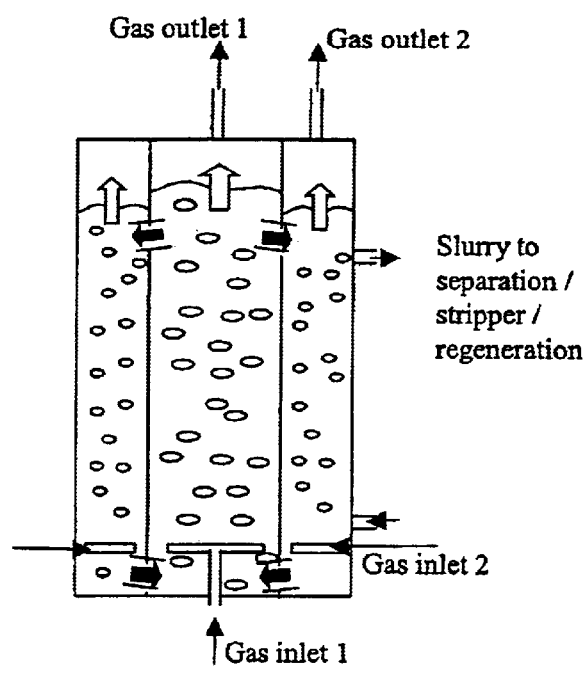
Figure 13:
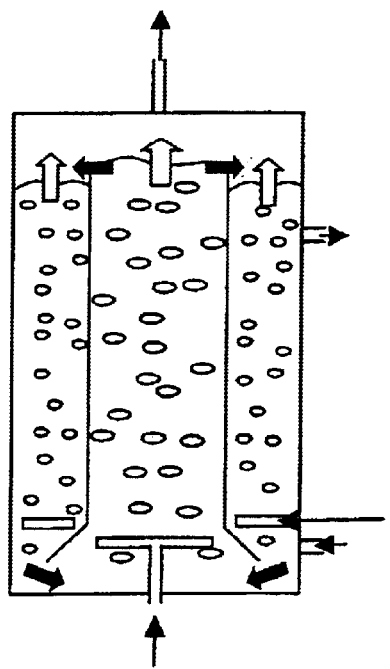
Figure 14:
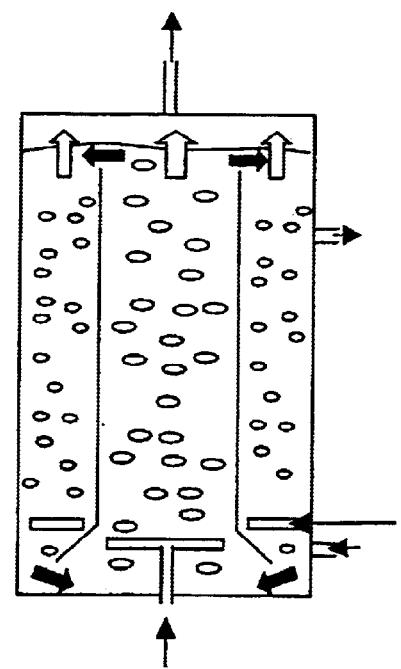

FIGS. 9–14 cover different embodiments of the conjoined reactor system in which the two reaction zones are in thermal contact in addition of being in fluid communication. The two zones are preferably comprised into one reactor vessel, and they are divided by at least one separation plate or baffle. The liquid circulation between the two reaction zones can be achieved by the use of perforations on one or more separation plates or baffles (See FIGS. 11, 12, 14), the use of small connectors to direct the liquid flow (see FIGS. 9, 12) and/or overflow of the liquid phase from one, reaction zone to the other one (see FIGS. 10, 13). In these alternative embodiments, the conjoined reactor system can comprise only one gas outlet (FIGS. 10, 11, 13, 14) or can comprise more than one (FIGS. 9, 12). In addition, the gas inlets can be fed via a gas distributor placed at the bottom of the reaction zones (FIGS. 9, 10, 11) or can be placed on the sides of the reaction zones (FIGS. 12, 13, 14).

The process is preferably but not necessarily run in a continuous mode. In this mode, typically, the gas hourly space velocity through the reaction zone may range from about 50 volumes/hour/volume expanded catalyst bed (v/hr/v) to about 10,000 v/hr/v, preferably from about 300 v/hr/v to about 2,000 v/hr/v. The gas hourly space velocity is defined as the volume of reactants per time per reaction zone volume. The volume of reactant gases is at standard conditions of pressure (101 kPa) and temperature (0° C.). The reaction zone volume is defined by the portion of the reaction vessel volume where reaction takes place and which is occupied by a gaseous phase comprising reactants, products and/or inerts; a liquid phase comprising liquid/wax products and/or other liquids; and a solid phase comprising catalyst. The reaction zone temperature is typically in the range of from about 160° C. to about 300° C. Preferably, the reaction zone is operated at conversion promoting conditions at temperatures from about 190° C. to about 260° C. The operating temperature may be determined by the nature of the catalyst. The reaction zone pressure is typically in the range of about 80 psia (552 kPa) to about 1000 psia (6895 kPa), more preferably from 80 psia (552 kPa) to about 600 psia (4137 kPa), and still more preferably, from: about 140 psia (965 kPa) to about 500 psia (3447 kPa).

The reaction products will have a large range of molecular weights. Catalysts can be selected for use in the present system that are useful for making hydrocarbons having five or more carbon atoms, especially when the above-referenced space velocity, temperature and pressure ranges are employed.

The wide range of hydrocarbon species produced in the reaction zone will typically result in both liquid- and gas-phase products at reactor conditions. The gas-phase product stream may be cooled and passed into a vapor-liquid separation zone to condense the light hydrocarbons and to condense and remove water. The vapor phase material may be passed into a second stage of cooling for recovery of additional hydrocarbons and removal of more water. The liquid-phase material can also comprise waxy hydrocarbons at reaction conditions. The liquid-phase material from the initial vapor-liquid separation zone, together with any liquid from a subsequent separation or treatment zone, may be fed into a fractionation column. Typically, a stripping column is employed first to remove light hydrocarbons such as propane and butane. The remaining hydrocarbons may be passed into a fractionation column, where they can be separated by boiling point range into products such as naphtha, middle distillates, kerosene and fuel oils. Hydrocarbons recovered from the reaction zone and having a boiling point above that of the desired products may be passed into conventional hydroprocessing equipment such as a hydrocracking zone in order to reduce their molecular weight. The gas phase recovered from the reactor zone effluent stream after hydrocarbon recovery and water removal may be partially recycled if it contains a sufficient quantity of unconverted hydrogen and/or carbon monoxide.

EXAMPLES

The following theoretical examples illustrate the principles and advantages of the present invention.

Conventional reactors were modeled at two superficial gas velocities and two temperatures. In addition, a reactor system embodying the present invention was modeled at similar operating conditions. Results of those simulations are given in Table 1 below. It can be seen that when the reactors are coupled in the manner described herein, a given catalyst system can be operated at a much higher productivity. Specifically, for a given maximum temperature of 223° C. (dependent on the catalyst composition and structure), reactors without liquid circulation have to be operated at an average temperature of 220° C. in order to ensure that no portion of the reactor experiences temperatures above the allowable maximum. At 220° C., the CO conversions are 49.5% and 72.4% for the inlet superficial gas velocities of 0.3 and 0.2 m/s, respectively. When these two reactors are conjoined, both reactors can be operated at an average temperature of 222.5° C. because the circulation of the catalyst ensures a more uniform temperature distribution. As shown in Table 1, the CO conversion increases about 5% in each reactor.

TABLE 1

|  | Separate Reaction zones | | Conjoined Reaction zones | |
| --- | --- | --- | --- | --- |
|  | Reaction zone 1 | Reaction zone 2 | Reaction zone 1 | Reaction zone 2 |
| Temperature, ° C. | 220 | 220 | 222.5 | 222.5 |
| Inlet superficial gas velocity, m/s | 0.3 | 0.2 | 0.3 | 0.2 |
| CO conversion, % | 49.5 | 72.4 | 54.9 | 77.3 |
| Productivity, gHC/kgcat/hr | 684 | 596 | 757 | 636 |
| Space-time-yield, gHC/lit. vol/hr | 98 | 94.9 | 109 | 101 |

The preferred embodiments of the present invention relate to methods and apparatus for constructing and operating a catalytic reactor. The present invention is susceptible to embodiments of different forms. The drawings and discussion herein disclose specific embodiments of the present invention with the understanding that the present disclosure is to be considered an exemplification of the principles of the invention, and is not intended to limit the invention to that illustrated and described herein.

Furthermore, the methods and apparatus for constructing and operating a catalytic reactor can be modified without departing from the scope of the invention. For example, the size, number, and position of the reactor tanks, coupling pipes, and additional devices can all be varied. Likewise, the reactor volumes that are shown and referred to as separate tanks in can instead be provided as separate zones within a single reactor, or can be repeated or grouped so that slurry circulates among more than two reaction zones. In addition, systems or functions that are disclosed separately need not be performed separately unless otherwise so recited. By way of example only, the wax removal function could be combined with the water stripping function. Reference is made to a Fischer-Tropsch reactor, but the use of the concepts of the present invention is not limited to the Fischer-Tropsch reaction or for use solely with a catalytic reactors and can be used with any other reactor or mixing application exhibiting beneficial properties. It is to be fully recognized that the different teachings of the embodiments discussed herein may be employed separately or in any suitable combination to produce desired results.

What is claimed is:

1. A method for producing hydrocarbonaceous products from synthesis gas in a multiphase catalytic system, comprising:

(a) providing a reactor system comprising separate first and second reaction zones, each reaction zone comprising a liquid phase and a solid phase containing a catalyst, the first and second reaction zones being in fluid communication with each other via a lower fluid flow passage and an upper fluid flow passage, said each flow passage having an inlet and an outlet;

(b) feeding a first gas comprising $H_2$ and CO into the bottom of said first reaction zone and a second gas comprising $H_2$ and CO into the bottom of second reaction zone such that the superficial gas velocity in the first reaction zone is greater than the superficial gas velocity in the second reaction zone and a pressure differential exists across at least said lower fluid flow passage; and (c) creating a liquid circulation from the first reaction zone through the upper fluid flow passage to the second reaction zone and from the second reaction zone through the lower fluid flow passage to the first reaction zone by said pressure differential; and (d) controlling the liquid circulation to achieve a desired liquid circulation velocity.

2. The method according to claim 1 wherein the superficial gas velocity in the first reaction zone is between 17 and 60 cm/sec.

3. The method according to claim 1 wherein the superficial gas velocity in the first reaction zone is between 2 cm/s and 45 cm/s greater than the superficial gas velocity in the second reaction zone.

4. The method according to claim 3 wherein the superficial gas velocity in the second reaction zone is between 15 and 58 cm/s.

5. The method according to claim 1 wherein step (d) comprises adjusting the difference in superficial gas velocities between the two reaction zones.

6. The method according to claim 1 wherein step (d) comprises using a valve in at least one of said fluid flow passages.

7. The method according to claim 1 wherein step (d) results in a slurry circulation velocity between 0.5 and 20 cm/s.

8. The method according to claim 1 wherein step (d) includes selecting the gas superficial velocities for the first and second reaction zones such that slurry flows up through the first reaction zone, into the second reaction zone through the upper fluid flow passage, down through the second reaction zone and into the first reaction zone via the lower fluid passage.

9. The method according to claim 1, further including maintaining fluid circulation between the first and second reaction zones substantially continuously during operation.

10. The method according to claim 1 wherein circulation between the first and second reaction zones is intermittent.

11. The method according to claim 1 wherein the first gas and the second gas have the same molar ratio of hydrogen to carbon monoxide.

12. The method according to claim 1 wherein the first gas and the second gas have different molar ratios of hydrogen to carbon monoxide.

13. The method according to claim 1 wherein the reactor system contains a Fischer-Tropsch catalyst.

14. The method according to claim 1, further including removing water from the reactor system.

15. The method according to claim 1, further including converting a portion of said first and second gases to hydrocarbonaceous products.

16. The method according to claim 15, further including removing hydrocarbonaceous products from the reactor system.

* * * * *